Figure 1:
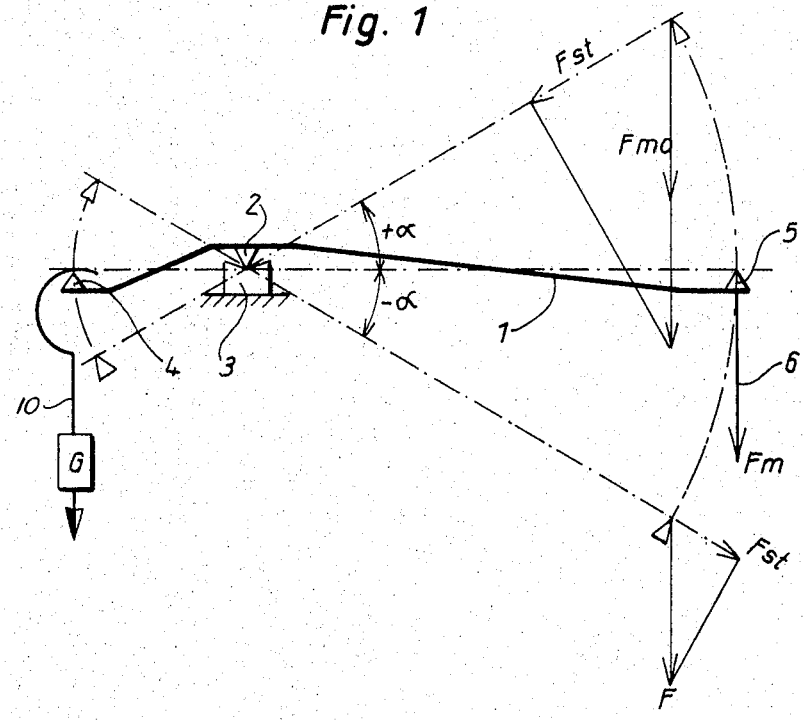

United States Patent [19]

Kuhnle

[11] 3,856,098
[45] Dec. 24, 1974

[54] SPRING BALANCE APPARATUS PROVIDED WITH COMPENSATION FOR MEASURING ERROR DUE TO TEMPERATURE CHANGES

[75] Inventor: Ernst Kuhnle, Balingen, Wurttemberg, Germany

[73] Assignee: Bizerba-Werke Wilhelm Kraut KG, Balinger/Wurtt, Germany

[22] Filed: Aug. 28, 1973

[21] Appl. No.: 392,346

[30] Foreign Application Priority Data
Aug. 29, 1972  Germany............................ 2242445

[52] U.S. Cl................................. 177/227, 177/226
[51] Int. Cl............................................. G01g 3/18
[58] Field of Search ........... 177/166, 170, 188, 186, 177/194, 225–229, 251

[56] References Cited
UNITED STATES PATENTS

| 674,883 | 5/1901 | Smith.................................... 177/226 |
| 1,921,848 | 8/1933 | Stimpson et al. .................... 177/227 |
| 2,796,252 | 6/1957 | Stelter................................... 177/226 |
| 3,356,169 | 12/1967 | Tate et al............................. 177/226 |
| 3,522,857 | 8/1970 | Ast........................................ 177/227 |

FOREIGN PATENTS OR APPLICATIONS

| 1,579,798 | 8/1969 | France................................. 177/227 |
| 1,057,043 | 2/1967 | Great Britain....................... 177/172 |
| 684,567 | 12/1953 | Great Britain....................... 177/172 |

Primary Examiner—Stephen J. Tomsky
Assistant Examiner—Vit W. Miska
Attorney, Agent, or Firm—Fleit & Jacobson

[57] ABSTRACT

Spring balance apparatus including a weighing lever supported on a knife edge balance point with one side of the lever acted on by a mass to be weighed against a weighing spring coupled with the other side of the weighing lever, and including an arrangement for the compensation of a measuring error due to temperature change by modifying the ratio of transmission of forces applied to the weighing lever by means of a bimetallic element in which the inventive improvement comprises a knife edge member transferring the forces of the weighing spring to the other side of the weighing lever which knife-edge member has connected rigidly to it an actuating lever coupled to the bimetallic element to alter responsive to temperature changes the orientation of the knife edge member relative to the other side of the weighing lever and thereby modify the ratio of transmission of forces to compensate for measuring error that would otherwise occur due to temperature change.

6 Claims, 2 Drawing Figures

3,856,098

SPRING BALANCE APPARATUS PROVIDED WITH COMPENSATION FOR MEASURING ERROR DUE TO TEMPERATURE CHANGES

DESCRIPTION OF THE INVENTION

The invention relates to spring balance apparatus provided with compensation for measuring error due to temperature changes by modifying the ratio of transmission of a weighing lever by adjusting or altering the distance or position of a knife-edge member relative to the axis of rotation of the lever through the use of a temperature dependent bimetal element.

In known spring balance apparatus or devices of this type, the bimetal element is mounted to act on the knife-edge member directly, in the direction of the adjustment. For that reason, the knife-edge member must be mounted so that it is easily movable; e.g., on ball bearings, so that it will be able to follow the required temperature adjustment even when it is weighed or has a load on it. The known devices and apparatus have two disadvantages. First, the modifications of distance that can be brought about by means of bimetal elements directly are very small and thus adequate adjustment by the bimetal element acting directly on the knife-edge, are difficult. Second, the ease of motion of the knife-edge member is problematical, inasmuch as, upon moving the weighing lever off its normal horizontal position, the motivating force that produces the off horizontal motion while attacking vertically on the knife-edge connected with it, generates an interfering component in the axial direction of the lever and this component has the tendency of displacing the knife edge and of changing the ratio of transmission in an undesirable manner.

It is the object of the invention to remedy the shortcomings described above, and to provide a spring balance apparatus or device provided with compensation of measuring errors caused by the temperature changes. In the inventive apparatus the bimetal element can be adjusted easily and the effect of interfering forces on the weighing lever when moved out of its normal horizontal position, has been eliminated.

In accordance with the invention, the problem is solved in the following way: A knife-edge member having two edges lies, with one of its edges, against the weighing lever, while its other edge holds an attachment that feeds in the energy or transfers a load, an actuating lever is connected rigidly with the knife-edge member, and the bimetal element acts upon that lever.

Figure 2:
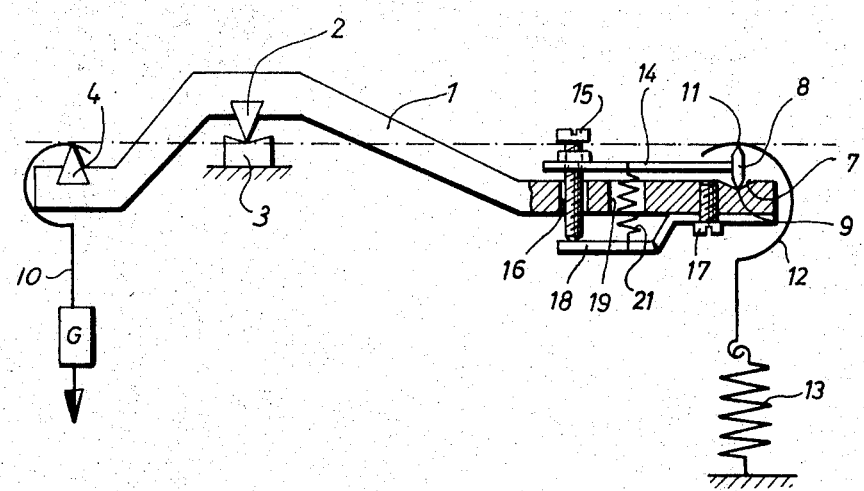

The specific description of a preferred embodiment of the invention now follows in connection with the accompanying drawing which shows:

In FIG. 1 a schematic drawing of the interference forces occurring on a weighing lever, and in FIG. 2, a preferred embodiment designated in accordance with the invention, for the temperature compensation of a spring balance.

In FIG. 1, a two-armed weighing lever 1 of a spring balance is supported on a permanently fixed pan 3 by means of an edge 2, in a way which, as such, is known. On one arm of the lever (in FIG. 1, on the left one), a weighing load G acts by way of another edge 4 connected with the lever 1. In the schematic drawing of FIG. 1, the load G acts directly on the weighing lever 1 by means of an attachment 10, but it is possible, as a matter of course, to use additional levers with appropriate articulated joints between the weighing load G and the edge 4, in a manner that is well known. A spring which provides the measuring force $F_m$, which acts in the direction of the vertical arrow 6, acts on the other arm of the weighing lever 1 by way of an edge 5, which is connected with the lever, in a way that has only been generally shown in the drawing.

Two possible positions of the weighing lever 1 have been indicated by dash-dot lines showing a swing of the lever through an angle of $+$ or $-\alpha$. It can be seen that, in the case of any swing, the measuring force $F_m$, which is assumed always to act vertically, produces, in both positions due to the swing, a component of force $F_{st}$ that may be directed either toward or away from the edge 2 of the weighing lever 1. When the edge 5 is connected with the weighing lever 1 in such a way that it can be displaced easily, e.g., by way of a bimetal element, this component of force achieves a displacement of that edge 5 that cannot be compensated by the elastic restoring force of the bimetal element; rather, it modifies the ratio of transmission on the weighing lever and, in that way, is responsible for an incorrect measuring result.

FIG. 2 shows a preferred embodiment of the invention which does not present the imperfection as described in connection with FIG. 1. Once more, the weighing lever 1 is supported for pivotal motion by means of an edge 2, on a pan 3 that is permanently fixed on and supported by the under-structure of the balance. An edge 4 mounted on lever 1, with or without an additional lever system, transmits the load G to be weighed to lever 1 via attachment 10. On the lever arm, opposite edge 4, a knife-edge member 8 with two edges 9 and 11 rests in a depression or recess formed in the top of a pan 7. The lower edge 9 of the knife-edge member 8 lies in the depression in pan 7, while the measuring force of a spring 13 acts on the upper edge 11 by way of an attachment 12. Here, too, an additional lever system could be interposed between the knife-edge member 8 and the spring 13.

The knife-edge member 8 is rigidly connected with one end of a laterally projecting actuating lever 14, which has been equipped at its other end with an adjustable regulating screw 15. The regulating screw 15 extends freely through a smooth bore-hole 16 formed in the weighing lever 1 and contacts at its lower end a bimetallic element 18 the construction of which is known as such. Element 18 is mounted at one end on the weighing lever 1 by a screw 17 and its other end is free and shaped or deformed to be spaced from the weighing lever 1. The lower end of screw 15 bears against the free end of bimetallic element 18. A spring 21 couples elements 18 and actuating lever 14 through a bore 19 formed in weighing lever 1. The spring 21 serves to couple together the actuating lever 14 and the bimetallic element 18 so that lever 14 via screw 16 will track movements of element 18. At the same time, the spring 21 exerts a force holding the lower edge 9 of the knife-edge element 8 firmly in the depression of pan 7. This latter objective may also be achieved by means of a separate spring.

The arrangement as described operates in the following way. In the case of a temperature change, the free shank or end of the bimetallic element 18 deflects and moves up or down. This motion is transmitted, by virtue of spring 21, through the regulating screw 15 to actuating lever 14 and causes pivotal motion of same about knife edge 9. Thus, the edge element 8 is rotated around the lower edge 9 as its axis of rotation, by way of the relatively long actuating lever 14, so that the distance beteen the upper edge 11 which feeds in the measuring force of the spring 13, and the edge 2 which serves as the axis of rotation for the lever 1 is accordingly varied or altered and thereby the ratio of transmission of the actuating lever 1 is modified in dependence on the temperature. This result is produced when a temperature change occurs regardless of the sense of the bimetallic element 18 moving downwardly or upwardly, the spring 21 forces the actuating lever 14 and the knife-edge element 8 which is connected with it, to track or be carried along with movements of bimetallic element 18 and hence the ratio of transmission will be modified in either sense.

The device or apparatus made in accordance with the invention offers the following advantages. By means of the screw 15 and of the actuating lever 14, the knife-edge element 8 is relieved or isolated from axially acting forces of interference, as shown in FIG. 1. The provision of the relatively long actuating lever 14 makes it possible to use a bimetallic element 18 with great working lift or deflection and thereby adjustment is rendered more simple. It is important to keep the distance of the two edges 9 and 11 on the knife-edge element as short as possible, so that the moments of intereference around the edge 9 will be as small as possible in the extreme positions of the lever 1.

Although the invention has been described in terms of a specific embodiment, nevertheless it can be varied in many respects, without any deviation from the basic concept or idea. It is possible to use a bimetallic system consisting of several elements with correspondingly greater and/or stronger lift or deflection, instead of one singe bimetallic element. In addition, the knife-edge element 8 which, in the preferred embodiment described is rotatably mounted or supported by pan 7, may be resiliently mounted by being supported by springs. The most important factor is the following: the bimetallic strip does not act directly on the knife-edge member in the direction of its displacement, and means are provided whereby the forces of interference explained on the basis of FIG. 1 are absorbed.

What is claimed is:

1. A spring balance apparatus comprising: an elongated weighing lever having a weighing side at one end thereof adapted to receive a mass to be weighed, and a biasing side on the other end thereof with a seat on one surface adapted to receive a biasing force; biasing means for exerting a biasing force on said seat in a direction substantially perpendicular to the longitudinal dimension of said weighing lever; a knife-edge member extending in a direction substantially perpendicular to the longitudinal dimension of said weighing lever, having a first pivot end contacting said seat and a second end associating with said biasing means for transferring the force exerted thereby to said seat; an actuating lever rigidly connected at one of its ends to said knife-edge member, extending in a direction substantially parallel to the longitudinal dimension of said weighing lever, and pivoting relative to said weighing lever about said pivot end of said knife-edge member; an elongated bimetallic element having one end fixedly mounted on the surface of said weighing lever opposite from said seat, and the other end spaced from said weighing lever, aligned with the end of said actuating lever remote from said knife-edge member, and free to move toward and away from said actuating lever; spacer means for engaging the free end of said bimetallic element and the end of said actuating lever remote from said knife-edge member, and for maintaining a predetermined spacing therebetween; biasing engagement means attached to said actuating lever intermediate said knife-edge member and said spacer means, and to said bimetallic element intermediate said fixed end and said free end for biasing together said actuating lever and said bimetallic element; and a fulcrum point on said weighing lever intermediate said weighing side and said biasing side, about which said weighing lever is free to pivot; said bimetallic element, said knife-edge member, said actuating lever and said biasing means associating in such a manner that an excursion of said bimetallic element as a result of a temperature change pivots said actuating lever about the pivot end of said knife-edge member, and thereby changes the spacing between said fulcrum and the second end of said knife-edge member through which the force exerted by the biasing means transfers, hence modifying the ratio of transmission of forces to compensate for measuring error that would otherwise occur due to temperature change.

2. An apparatus in accordance with claim 1, the further inprovement of a given excursion of said bimetallic element results in a lesser changing in spacing between said fulcrum and the second end of said knife-edge member.

3. In apparatus in accordance with claim 1, the further improvement of the knife-edge member possesses only one edge that is coupled to said spring means and the knife-edge member is coupled with the weighing lever means by way of a spring joint.

4. In apparatus in accordance with claim 1, the further improvement of the bimetallic element coupled to the actuating lever by way of an adjustable regulating screw.

5. In apparatus in accordance with claim 1, the further improvement of the edge of the knife-edge element being kept by spring tension in contact with the weighing means, preferably in a pan mounted as the weighing lever means and having a depression.

6. In apparatus in accordance with claim 1, the further improvement of said spring means acting on an edge of the knife-edge element which faces away from the weighing lever means.

* * * * *